UNITED STATES PATENT OFFICE.

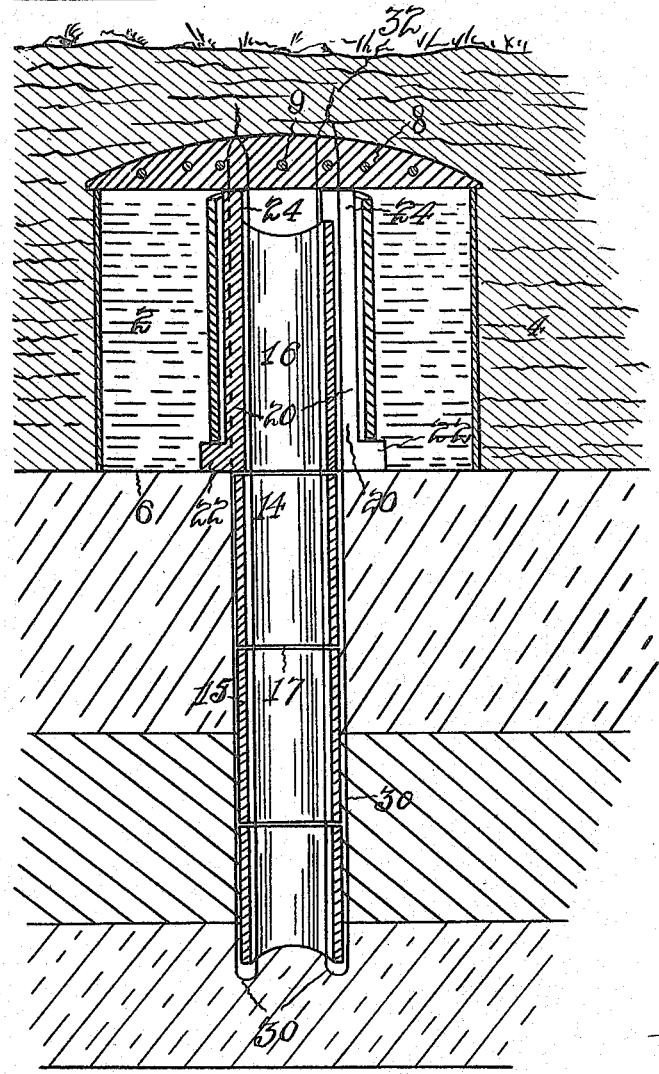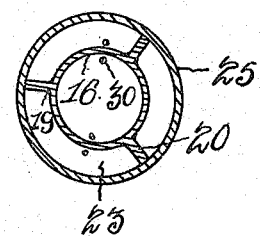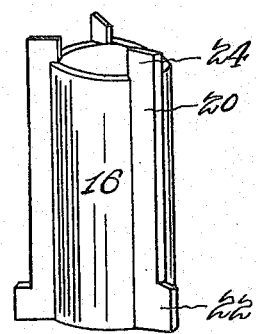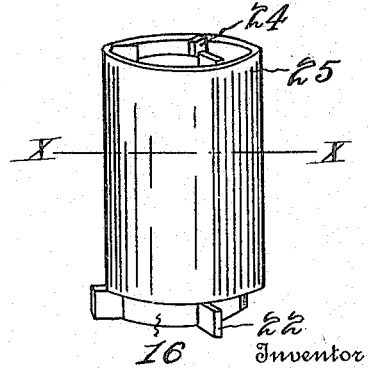

ERASTUS W. APPELMAN, OF CLERMONT, IOWA, ASSIGNOR, BY MESNE ASSIGNMENTS, TO AMERICAN DRAINAGE COMPANY, OF DUBUQUE, IOWA, A CORPORATION OF IOWA.

METHOD OF DRAINING LAND.

1,129,324.        Specification of Letters Patent.        Patented Feb. 23, 1915.

Application filed May 24, 1911. Serial No. 629,937.

*To all whom it may concern:*

Be it known that I, ERASTUS W. APPELMAN, citizen of the United States, residing at Clermont, in the county of Fayette and State of Iowa, have invented certain new and useful Improvements in Methods for Draining Land, of which the following is a specification.

My invention relates to systems or methods of draining land and the object is to provide a method whereby a partial vacuum is automatically formed at times, some distance beneath the surface of the ground, by which the moisture is drawn from a great distance and after the water has been filtered, to then deliver it into a drain to be disposed of in porous or water bearing earth.

It consists in forming a partial vacuum chamber at some distance beneath the soil, then in filtering the water as it is drawn into the chamber, and then delivering the filtered water into receiving earth below the chamber.

The following specification and the drawings accompanying the same will point out one convenient mode whereby the method can be successfully carried out.

Figure 1 is a vertical section of the device in position. Fig. 2 is a perspective view of the soil fender in position upon the tile. Fig. 3 shows the tile removed. Fig. 4 is a cross section on line x—x of Fig. 2.

Like characters of reference denote corresponding parts in all of the figures.

Referring to the drawings, 2 designates the chamber which is formed by excavating the earth for a considerable space below the surface of the ground. If the soil be sandy or of slight consistency, then preferably a corrugated tube 4 may be sunk into and form the walls of the chamber. If, however, the ground be clay or other self-sustaining ground then the tube 4 may be dispensed with. Where the tube is used there may be openings at various points in the tube 4, though these openings are not a necessity. The bottom 6 of the chamber is earth. The forming of this chamber at some depth below the surface of the soil is one of the essential elements in the successfully carrying out of my method and aids largely with the devices hereinafter to be described in causing a tendency toward a vacuum in the chamber beneath the ground.

The chamber 2 is covered with a circular plate 8 preferably made of cement or other porous material, horizontal on its lower surface and oval on its upper surface. It is also strengthened by casting in metal rods 9 with the cement. The plate projects slightly beyond the walls of the chamber. This plate over the top of the chamber is formed so as to resist a large pressure, whereby it may be covered with earth 12 sufficiently deep to protect from frost and so as to seal the top of the chamber practically air-tight for the purposes presently to appear.

In the base of the chamber is sunk an opening 14 preferably to such depth as will reach porous or water carrying earth, the depth of which is varied by the conditions of the soil. The opening 14 is curbed by porous formed tubes 15 usually about a foot in length which are sunk in the bottom of the opening and each section rests upon the section below and leaves a seam 17 at the junction of any two sections.

Upon the upper section, is placed a tile 16 that extends nearly to the top of the chamber. Outside, and preferably formed integral with the tile 16, are stays or supports 20 terminating at their lower ends in shoulders 22, which shoulders project out at substantially right angles to the tile 16 and are slightly curved where they join the tile. The upper end of the stays also are formed into shoulders 24 that project inward over the top of the tile and on these shoulders rest the cover plate 8.

Around the tile 16 and just in contact with the supports 20 is a soil fender 25. The soil fender sets upon the lower shoulders 22 and extends upward nearly to the top of the shoulders 24 of the supports and very close to the cover plate 8 but not in contact with the plate. There is also left a space 23 between the tile and soil fender of about the width of the supports.

Through the cover are small openings in which are inserted wires 30 that extend down within the fender upon the outside of the tile 16 and drain tubes 15 and upon the inside of said drain and tile and are united together at the upper side of the cover plate 8 by a twist 32 in the wire. This rigidly holds the cover plate upon the shoulders 24 and also holds the sections of the drain pipe and the tile rigidly together making a continuous pipe from the top of the tile to the bottom of the drain with the exception of the seams 17. If a large amount of water is delivered down and washes out beneath the lower section then this will hold the different sections of the drain pipe in the original position they were placed when they were inserted in the ground.

In its operation the moisture from the soil around will filter through the ground into the chamber 2 and the chamber and the space between the soil fender and the tile up to the top of the tile will be filled and then the water will pass over into the tile and down through the drain into the earth. If, at any time, the moisture ceases to be filtered into the chamber 2, the water in the chamber will gradually pass down around the sections 15, not only through the porous sections but through the seams 17 between the sections and be disposed of at the bottom of the drain. By this action the water passing out of the chamber will leave a partial vacuum which will draw the moisture from a large distance to fill the chamber and also be drawn through the seams 17 and through the sides of the sections 15 which will have a strong tendency to produce a vacuum in the chamber and there will be very little air drawn into the chamber since the cover is practically sealed airtight and the moisture will fill the small spaces between the particles of earth and prevent the air from passing into the chamber. It will be seen that since the chamber is formed at such distance beneath the ground and the water is filtered into the chamber, that there will be no danger of any freezing or any clogging of the drain, and that the tendency toward a vacuum is so strong after the chamber has once been filled, that the moisture will be drawn from a very great distance around the chamber and around the seams and porous drain tubes.

Having now described my invention what I claim and desire to secure by Letters Patent is:—

1. The method of draining water from surface soil through normally impervious subsoil and discharging the water into a lower stratum of porous soil, which comprises forming a water receiving chamber in the surface soil at some distance below the ground level, connecting the water receiving chamber with the lower stratum of porous soil, and substantially preventing the access of air to the water-receiving chamber, so that the flow of water to the lower stratum of porous soil will tend to create a vacuum that will aid in drawing water from the surface soil to the water-receiving chamber.

2. The method of draining water from surface soil through normally impervious subsoil and discharging the water into a lower stratum of porous earth, which comprises maintaining below the ground level a water-receiving chamber sealed by a substantial thickness of earth from access to the air, filtering the water into said chamber, connecting said water-receiving chamber with said lower stratum of porous earth, and utilizing the gravity pull of the water flowing to said lower stratum of earth for producing a tendency to a vacuum that will draw the water from the surface soil to said water-receiving chamber.

In testimony whereof I affix my signature in presence of two witnesses.

ERASTUS W. APPELMAN.

Witnesses:
M. M. CADY,
A. B. HANSHAW.